(12) United States Patent
Rall

(10) Patent No.: US 6,224,833 B1
(45) Date of Patent: May 1, 2001

(54) APPARATUS FOR CONTACTING OF GASES AND SOLIDS IN FLUIDIZED BEDS

(75) Inventor: Richard R. Rall, Wichita, KS (US)

(73) Assignee: Koch-Glitsch, Inc., Wichita, KS (US)

( * ) Notice: Subject to any disclaimer, the term of this patent is extended or adjusted under 35 U.S.C. 154(b) by 0 days.

(21) Appl. No.: 09/459,230

(22) Filed: Dec. 10, 1999

Related U.S. Application Data

(60) Provisional application No. 60/112,258, filed on Dec. 15, 1998.

(51) Int. Cl.[7] .............. F27B 15/00; B01J 8/24; B01J 8/44
(52) U.S. Cl. ............... 422/143; 422/139
(58) Field of Search .......... 422/139, 140, 422/143, 144; 261/75, 94, 96; 366/336, 337, 338, 339

(56) References Cited

U.S. PATENT DOCUMENTS

| | | | |
|---|---|---|---|
| 2,472,502 | 6/1949 | Tyson | 422/144 |
| 2,481,439 | 9/1949 | Ogorzaly | 422/144 |
| 2,491,536 | 12/1949 | Tyson | 23/288 |
| 4,220,416 | 9/1980 | Brauner et al. | 366/337 |
| 4,493,735 | 1/1985 | Flaschel et al. | 134/25.1 |
| 4,497,751 | 2/1985 | Pluss | 261/94 |
| 4,497,753 | 2/1985 | Strieff | 261/95 |
| 4,615,992 | 10/1986 | Murphy | 502/41 |
| 5,462,717 | 10/1995 | Pfeiffer | 422/146 |
| 5,716,585 | 2/1998 | Senegas et al. | 422/144 |

FOREIGN PATENT DOCUMENTS 2061746  5/1981  (GB).

OTHER PUBLICATIONS

Correlating Throughput and Backmixing in Fluidized Beds, *Hydrocarbon Processing*, 1995, pp. 81–87.
Expansion Characteristics of Liquid–Solid Fluidized Beds in Reactors Equipped with Internals, *German Chemical Engineering*, Edition 6, dated 1985, pp. 358–361.
Optimize Performance of Fluidized–Bed Reactors, *Chemical Engineering Process*, dated Apr., 1995, pp. 32–36.
"The Expansion Characteristics of Biocatalysts in Fluidized Bed Reactors Equipped with Internals", published in *Third European Congress on Biotechnology*, Munich, Sep., 1984, Verlag Chemie, Weinheim (FRG) 1984, pp. 1–8.

*Primary Examiner*—Shrive Beck
*Assistant Examiner*—Alexa A. Doroshenk
(74) *Attorney, Agent, or Firm*—Shook, Hardy & Bacon L.L.P.

(57) ABSTRACT

A gas-solid fluidized bed is formed within a contacting element having pairs of planar portions arranged in intersecting planes, each planar portion being formed by one or more webs and one or more open slots adjacent each web, the webs and slots being arranged such that a web in one of the planar portions intersects a slot in the paired planar portion. The fluidized bed can be catalyst particles fluidized by a gas stream, such as in a catalyst stripper and/or regenerator in an FCC system.

15 Claims, 3 Drawing Sheets

APPARATUS FOR CONTACTING OF GASES AND SOLIDS IN FLUIDIZED BEDS

CROSS-REFERENCE TO RELATED APPLICATIONS

This application claims the benefit of U.S. Provisional Application Ser. No. 60/112,258, filed Dec. 15, 1998.

BACKGROUND OF THE INVENTION

This invention relates generally to fluidized beds in which solids and fluids flow in a countercurrent relationship, and, more particularly, to the use of internal structures to facilitate contact between the solids and fluids in the fluidized bed.

Fluidized beds are frequently used in petroleum, chemical, combustion, and other types of processes to promote vigorous mixing and intimate contact of fluid streams and solid particles within a vessel. This intimate contacting can be used to achieve efficient heat transfer, mass transfer and/or chemical reaction between the fluid streams, solid particles, and/or fluids coated on or entrained with the solid particles. Fluidized beds are typically generated by passing the fluid stream, typically a vapor stream, upwardly through a bed of small solid particles at a flow rate sufficient to suspend the particles and cause a turbulent mixing of the solid particles. The lower boundary of the fluidized bed is formed at, or just below, the level of the fluid stream inlet. The upper boundary varies in relation to the velocity of the fluid stream and is formed at the level where the fluid disengages from the particles. The velocity of the fluid flow is maintained above that which will cause suspension of the solid particles and below that which will cause the particles to be carried out of the vessel or above the desired upper boundary level.

In some types of fluidized beds, the solid particles remain suspended in the fluidized bed and there is no net downward flow of the solid particles. In other types of fluidized beds, the solid particles are continually added at the top and removed from the bottom of the fluidized bed so there is a resulting downward flow of solid particles countercurrent to the upwardly flowing fluid. In both types of fluidized beds, it is generally desirable to reduce channeling of the fluid through the solid particles and the formation of stagnant zones of fluid or solid particles in the fluidized bed. It may also be desirable, particularly in the case of countercurrent fluidized beds, to reduce recirculation or backmixing of the solid particles and fluid within the fluidized bed because of the detrimental effect backmixing may have on the efficiency of the particular process occurring within the fluidized bed.

An example of a fluidized bed involving countercurrent flow of fluid streams and solid particles is found in certain types of strippers and regenerators used in fluid catalytic cracking or FCC systems. In such FCC systems, intermediate and high-boiling point hydrocarbons are atomized and brought into contact at high temperature with fluidized catalyst particles in a reactor whereby the hydrocarbons are cracked to produce lower boiling point reaction products such as gasoline. The reaction products and catalyst particles are then separated, such as in a cyclone, and each proceeds separately for further processing. The catalyst particles are typically removed from the reactor in a continuous fashion and subjected to further processing, first in a catalyst stripper to remove volatile hydrocarbons and then in a regenerator to remove nonvolatile carbonaceous material, called coke, which is deposited on the catalyst particles during the reaction process and reduces the effectiveness of the catalyst. In the catalyst stripper, entrained, interstitial and adsorbed volatile hydrocarbons are removed from the catalyst in a fluidized bed by countercurrently contacting the catalyst with a flowing gas stream, such as water vapor, in a process referred to as stripping. Removal of these residual hydrocarbons from the catalyst is desirable because the hydrocarbons may be recovered and returned to the process as a reaction product, rather than being conveyed with the catalyst particles to the regenerator where they would be combusted, thereby causing an increase in air demand to the regenerator. Combustion of the residual hydrocarbons in the regenerator may also contribute to degradation of the catalyst by subjecting the catalyst to elevated temperatures. The catalyst particles leave the stripper and are then directed to a regenerator where the coke deposits and any residual hydrocarbons are burned by passing the catalyst particles through a fluidized bed countercurrent to an oxidation gas, typically air, in a process referred to as regeneration. The regenerated catalyst particles are then returned to the reactor for further catalytic cracking of hydrocarbons. In these fluidized beds found in the FCC stripper and regenerator, it would be desirable for all of the catalyst particles and the fluid streams to pass through the fluidized beds in a fully countercurrent fashion without channeling and backmixing and with all catalyst particles and gas streams passing through the fluidized beds within defined time intervals, a condition known as plug flow, so that better and more predictable process efficiencies can be obtained.

It has been reported that devices, such as random packings, which have been used to approach the condition of plug flow in countercurrently flowing gas and liquid systems, do not necessarily work well in gas and solid particle systems because the solid particles can lodge in unaerated stagnant zones within the packing. It has also been reported that, through trial and error testing, some grid-type packings, such as chevron or disc and donut elements, have proven relatively effective in retarding the rate of top to bottom mixing of solids in well-fluidized beds. These grid-type packings, however, can reduce the quantity of fluids and solids that can pass through the fluidized bed because the packings force the fluids and solids to flow through constricted flow paths. In addition to reducing the flow capacity, the packings often have poor "turndown" performance because they offer acceptable processing efficiency only within a limited range of gas flow rates. Still further, these packings may permit large gas bubbles to form in the fluidized bed with several undesired consequences, including reducing the contacting efficiency between vapor and solids, increasing backmixing of solids by upward displacement of solid particles by the gas bubbles, and increasing entrainment of the solids into the dilute phase above the fluidized bed as a result of the large gas bubbles bursting upwards through the fluidized bed. As a result, a need has developed for a packing-type element that restricts less of the cross-sectional flow area of the fluidized bed, performs well across a wider range of gas flow rates, and reduces the formation of large gas bubbles within the fluidized bed.

Static mixing elements consisting of rigid forms are conventionally used for purposes such as to achieve thorough mixing, mass transfer, heat transfer, or chemical reaction in streams of flowable substances flowing co-currently through a pipe, vessel or other conduit. These elements can take many forms but typically utilize stationary deflectors that split, shear and then recombine the fluid streams or fluids and solids until a generally homogenous stream exists. Static mixers are typically of specialized design for specific use applications, such as those involving either liquid-liquid, liquid-solid, or gas-solid co-current flow, because good performance in one type of application doesn't necessarily indicate that the static mixer will perform well or even acceptable in other applications.

It has been suggested that one type of static mixing element, commonly known as an SMV element, can be used in liquid-solid fluidized beds to achieve higher solids concentration under certain liquid flow conditions. The SMV element comprises a bundle of corrugated sheets that are positioned so that corrugations of adjacent sheets are in contact with and extend at angles to each other, thereby forming liquid and solids flow paths along the peaks and valleys of the corrugations. The effect of the SMV element on backmixing of the solids, and the suitability of the element for use in gas-solid rather than liquid-solid fluidized beds, were not reported.

It has also been suggested in U.S. Pat. No. 5,716,585 that corrugated sheets of packing, such as modified SMV elements, can be used to facilitate stripping of solids in gas-solid fluidized beds. In that patent, the use of the corrugated sheets of packing in stripping units for spent FCC catalysts is specifically disclosed. The impermeable nature of the corrugated sheets, however, blocks passage of gases and solids through the sheets and may serve as an impediment to the desired exchange between stripping gas and hydrocarbons associated with the catalyst particles.

Another type of static mixing element is disclosed in U.S. Pat. No. 4,220,416 to Brauner et al. The element disclosed in that patent comprises pairs of planar portions arranged in spaced apart relationship in two perpendicular planes and joined together along a connecting spine, with a plurality of paired planar portions typically being placed end to end within a pipe or other conduit. Each planar portion comprises at least one web, and normally two or more webs that are spaced apart to provide open slots through which substances may flow for mixing. Although also used for other applications, these types of elements have proven particularly useful in mixing highly viscous polymer compounds flowing in co-current laminar flow. To date, there have been no reports suggesting the suitability of these elements for use in fluidized beds.

BRIEF SUMMARY OF THE INVENTION

It is an object of this invention to provide a fluidized bed with a contacting element that reduces backmixing of solids and gases in the fluidized bed so that a higher degree of plug flow and greater processing efficiency can be achieved in comparison to many types of conventional elements.

It is also an object of this invention to provide a vapor-solid fluidized bed with a contacting element that reduces the size of gas bubbles formed in the fluidized bed so that more gas surface area is available for contact with solids in the fluidized bed, with resulting increases in processing efficiency.

It is another object of this invention to provide a vapor-solid fluidized bed with a contacting element that provides a more even distribution of more uniformly sized, small gas bubbles than results from use of many types of conventional elements, such as disc and donut elements, so that greater processing efficiency and reduced vapor entrainment of solid particles can be obtained.

It is yet another object of this invention to provide a fluidized bed with a contacting element that permits high processing efficiency to be achieved while constricting a much smaller portion of the cross-sectional area of the fluidized bed in comparison to many types of conventional elements, such as disc and donut elements, so that a higher fluid and solid flow capacity can be maintained for the fluidized bed.

It is a further object of this invention to provide a fluidized bed with a contacting element that permits high processing efficiency and capacity across a wide range of superficial gas velocities so that the contacting element can be used in applications having widely variable gas velocities.

To accomplish these and other related objects of the invention, a contacting device, such as of the general type described in U.S. Pat. No. 4,220,416, which is incorporated herein by reference in its entirety, is positioned in a gas-solid fluidized bed in a vessel. The contacting device comprising one or more paired deflecting portions, each deflecting portion is typically, but not necessarily, planar and comprises a plurality of spaced apart webs extending at an acute angle across all or a portion of the cross section of the fluidized bed. The paired deflecting portions are joined together and form an angle which is typically 60 or 90 degrees, but can be other angles if desired. Open slots formed between the webs in each deflecting portion allow the flow of gas and solids therethrough.

It has unexpectedly been discovered that use of this type of mixing device in gas-solid fluidized beds provides higher flow capacity and overall efficiency in comparison to corrugated sheets and disc and donut trays.

BRIEF DESCRIPTION OF THE DRAWINGS

In the accompanying drawings which form part of the specification and are to be read in conjunction therewith, and in which like reference numerals are used to indicate like parts in the various views.

DETAILED DESCRIPTION OF THE INVENTION

Figure 1:
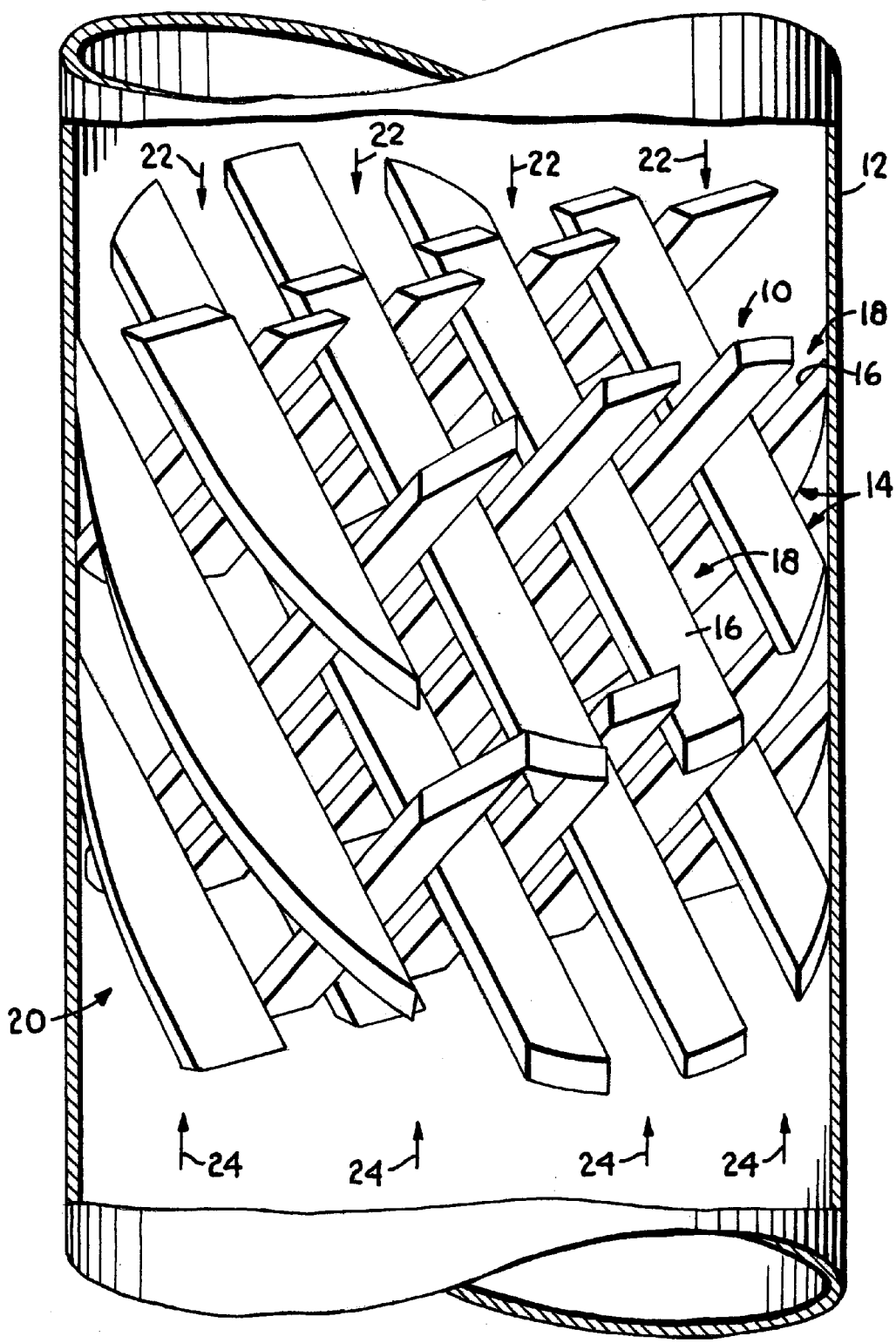
FIG. 1 is a schematic view of a column showing a fluidized bed containing a contacting element in accordance with the present invention.

Referring now to the drawings in greater detail, and initially to FIG. 1, a contacting element used in the present invention is designated generally by the numeral 10 and is shown somewhat schematically positioned within a cylindrical vessel or column 12. The column 12 is a container having a square, rectangular, or other desired cross section and is constructed of materials suitable for, and compatible with, the processing occurring within an open, interior region within an external shell of the column. The column 12 may be used for various types of fluidized bed processing of gases and solids, such as processes involving heat exchange, mass transfer, and/or chemical reaction. For example, the column 12 can be used to strip hydrocarbons from spent catalyst or to regenerate spent catalyst by burning coke from the spent catalyst in fluid catalytic cracking (FCC) processes. As other examples, the column 12 may be used to effect heat exchange between gases and hot catalyst in FCC and other processes, to scrub pollutants from flue gases, to combust coal or other fuel in electrical power generating processes, to cause drying of solid particles, and to cause blending, coating or agglomeration of solid particles. These examples are not intended to limit the scope of the invention, but are set forth to illustrate particular embodiments of the invention.

The contacting element 10 comprises a plurality of paired deflecting portions 14, each deflecting portion 14 comprising at least one, and normally a plurality of, spaced apart webs 16 extending at an acute angle across all, or a portion of, the cross section of the fluidized bed. Open slots 18 are formed between or adjacent the webs 16 in each deflecting portion 14 to allow the throughflow of gas and solids. The webs 16 themselves may be perforated to allow fluid to flow through the webs. The paired deflecting portions 14 extend in intersecting planes and are joined together either at one end or at an intermediate portion along their lengths. The webs 16 in each deflecting portion 14 are aligned to intersect with the slots 18 formed in the paired deflecting portion 14. The angle formed by the intersecting deflecting portions 14 is typically 60 or 90 degrees, but can be other angles if desired. The webs 16 in each deflecting portion 14 will typically lie in the same plane, but may extend in different planes if desired. Rather than being planar in nature, webs 16 may also be constructed in a curved or other desired shape.

Several paired deflecting portions 14 are joined together in an aligned, interconnected and intersecting fashion to form each contacting element 10. A number of contacting elements 10 may then be placed end to end in spaced apart or contacting relationship within the column 12. The adjacent elements can be placed in alignment or they may be rotated at an angle, such as 45 degrees, 90 degrees or other desired angle, from each other. The angle formed by the plane of the each deflecting portion 14 and a longitudinal axis of the column 12 varies depending upon the intersecting angle selected for the paired deflecting portions. For example, when a 90 degree intersecting angle is used, the deflecting portions 14 extend at an angles of 45 and 135 degrees to the column axis. When a 60 degree intersecting angle is selected, the deflecting portions 14 extend at 60 and 120 degrees to the column axis.

The contacting elements 10 may each be sized to completely fill the cross section of the column 12 or a number of smaller elements 10 may be positioned in side by side relationship to fill the column cross section. When positioned in side by side relationship, the elements 10 may be oriented in the same or different directions and may be positioned within a plurality of rows offset from each other.

In accordance with the present invention, a fluidized bed 20 is formed in the portion of column 12 in which the contacting element 10, or a plurality of contacting elements 10, are placed. The fluidized bed 20 is formed by particulate solids, represented schematically by arrows 22, and an upwardly flowing fluidizing gas, represented by arrows 24. The solids 22 are of preselected particle shape, size and composition and the gas 24 is of preselected composition and velocity. Preferably, the solids 22 will be added to the top and removed from the bottom of the fluidized bed 20 in a continuous manner so the solids 22 and gas 24 travel countercurrently through the fluidized bed. Alternately, the solids 22 remain in the fluidized bed 20 until processing has been completed and are then drained from the fluidized bed.

The gas 24, after traveling upwardly through the fluidized bed 20, enters a dilute phase above the fluidized bed and can be passed through a separator such as a cyclone (not shown) to remove any entrained solid particles before it is conveyed to a final or intermediate destination. The solids 22, after removal from the fluidized bed 20, can also be conveyed to a final or intermediate destination.

The contacting element 10 can be positioned at the desired vertical location within the fluidized bed 20. In some applications, it may be desirable to position the element 10, or a plurality of elements 10, near the upper and lower boundaries of the fluidized bed 20, while in other applications it may be desirable to position the elements a preselected distance from the boundaries. In still further applications, the elements 10 may extend above or even below the fluidized bed 20.

Figure 2:
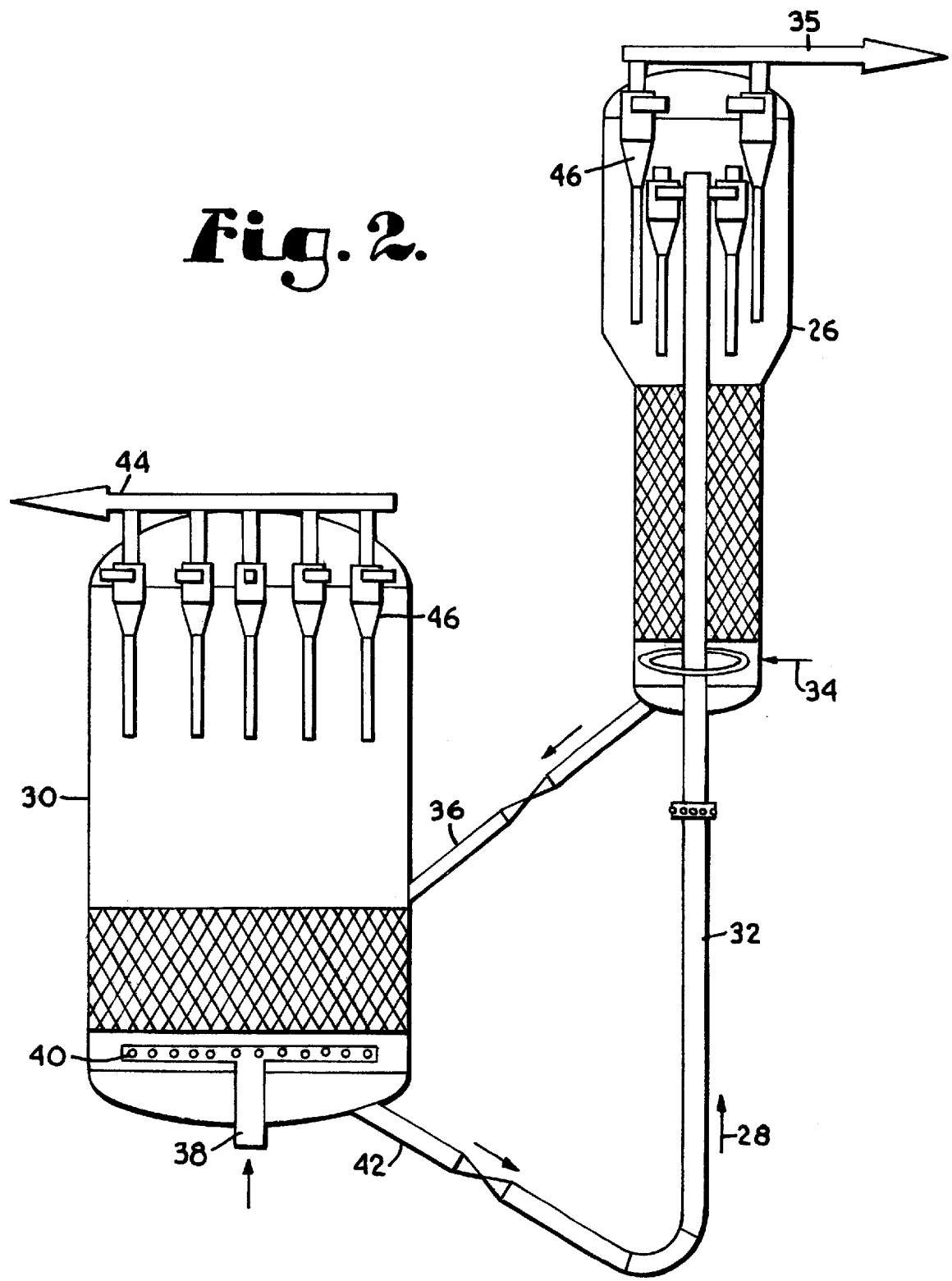
FIG. 2 is a schematic view of an FCC system employing the contacting element of the present invention.

The type of processing that occurs within the fluidized bed 20 can include heat transfer, mass transfer, combustion and/or chemical reaction. For example, the fluidized bed 20 can be used to strip hydrocarbons from spent catalyst or burn coke deposits on spent catalyst in FCC systems. An FCC system employing the contacting element 10 is illustrated in FIG. 2, in which volatile hydrocarbons are stripped from spent, solid catalyst particles (represented schematically by arrow 28) in a stripper column 26 before the catalyst particles are conveyed to a regenerator 30 where coke deposits are burned to regenerate the catalyst particles. The stripper column 26 has a central riser 32 which feeds spent catalyst particles in a carrier gas stream into the open internal region of the column 26. The catalyst particles then flow downwardly under the influence of gravity into and through the contacting element 10. Steam or another stripping gas is fed through flow line 34 to the column 26 at a location below the contacting element and flows upwardly to cause fluidization of the catalyst particles in the contacting element 10 and resulting stripping of the volatile hydrocarbons associated with the catalyst particles. Because the catalyst particles are fluidized during this contact with the gas stream, a higher degree of plug flow and greater processing efficiency can be achieved in comparison to convention stripping processes.

The overhead gas stream containing the stripped volatile hydrocarbons can be routed from the stripper 26 to the FCC reactor (not shown) or another desired location through flow line 35. The stripped catalyst particles are transferred by another flow line 36 from the stripper 26 to regenerator 30 where they flow downwardly through another contacting element 10. Air or another oxidation gas is fed through flow line 38 to a burner 40 positioned in a lower portion of the regenerator at a location below contacting element 10. The coke deposits on the catalyst particles are burned as the catalyst particles are fluidized in the contacting element 10, with resulting regeneration of the catalyst particles. The catalyst particles can then be returned through flow line 42 to the stripper 26 or can be routed to the FCC reactor (not shown). The overhead flue gas is routed through flow line 44 to a scrubber (not shown) or is otherwise processed. Cyclonic separators 46 are utilized in both the regenerator 30 and the stripper 26 to remove entrained catalyst particles from the overhead gas streams.

The contacting element 10 may also be used as a heat exchanger by forming the webs 16 in a double walled manner so that a heat exchange medium is able to flow within the webs 16 for heat exchange with a surrounding medium. As one example of this type of use, the ends of the webs 16 may extend through the column 12 and be connected to a header that distributes a fluid to the webs 16 for circulation therethrough. Another medium, such as a stationary or flowing solid or other fluid, surrounds the webs 16 and undergoes heat exchange with the segregated fluid circulating within the webs 16.

It has been discovered that the contacting element 10 provides unexpectedly good performance in gas-solid fluidized beds. In a series of comparative tests involving the use of air to strip helium from FCC equilibrium catalyst, the contacting element 10 demonstrated up to 20% higher flow capacity in comparison to disc and donut trays and a higher overall stripping efficiency in comparison to both disc and donut trays and SMV-type corrugated packing elements.

The reasons why the contacting element 10 performs unexpectedly well in gas-solid fluidized beds are not fully understood, but are believed to result in part from the intersecting webs 16 providing capture points that block upward displacement and recirculation of solids 22. By reducing this recirculation or backmixing, the solids 22 are able to advance downwardly through the fluidized bed 20 in a uniform manner approaching plug flow. The numerous intersecting webs 16 also reduce the size of gas bubbles that may form in the fluidized bed 20 and contribute to a more uniform distribution of small gas bubbles. These small bubbles provide greater surface area for gas contact with the solids 22 and resulting increases in efficiency. In addition, the small gas bubbles are less likely to cause upward displacement of the solids, and they reduce the amount of solids that are entrained with, and must be separated from, the gas in the dilute phase above the fluidized bed 20. The uniform distribution of the gas and solids also reduces formation of stagnant zones that would decrease the operating efficiencies. Remarkably, the increased efficiencies obtainable with the contacting element 10 are achieved across a wide range of superficial gas velocities and are achieved without reducing gas and solids flow capacity to an undesired level.

The following example is set forth to illustrate the invention and is not to be interpreted in a limiting sense.

EXAMPLE 1

Figure 3:
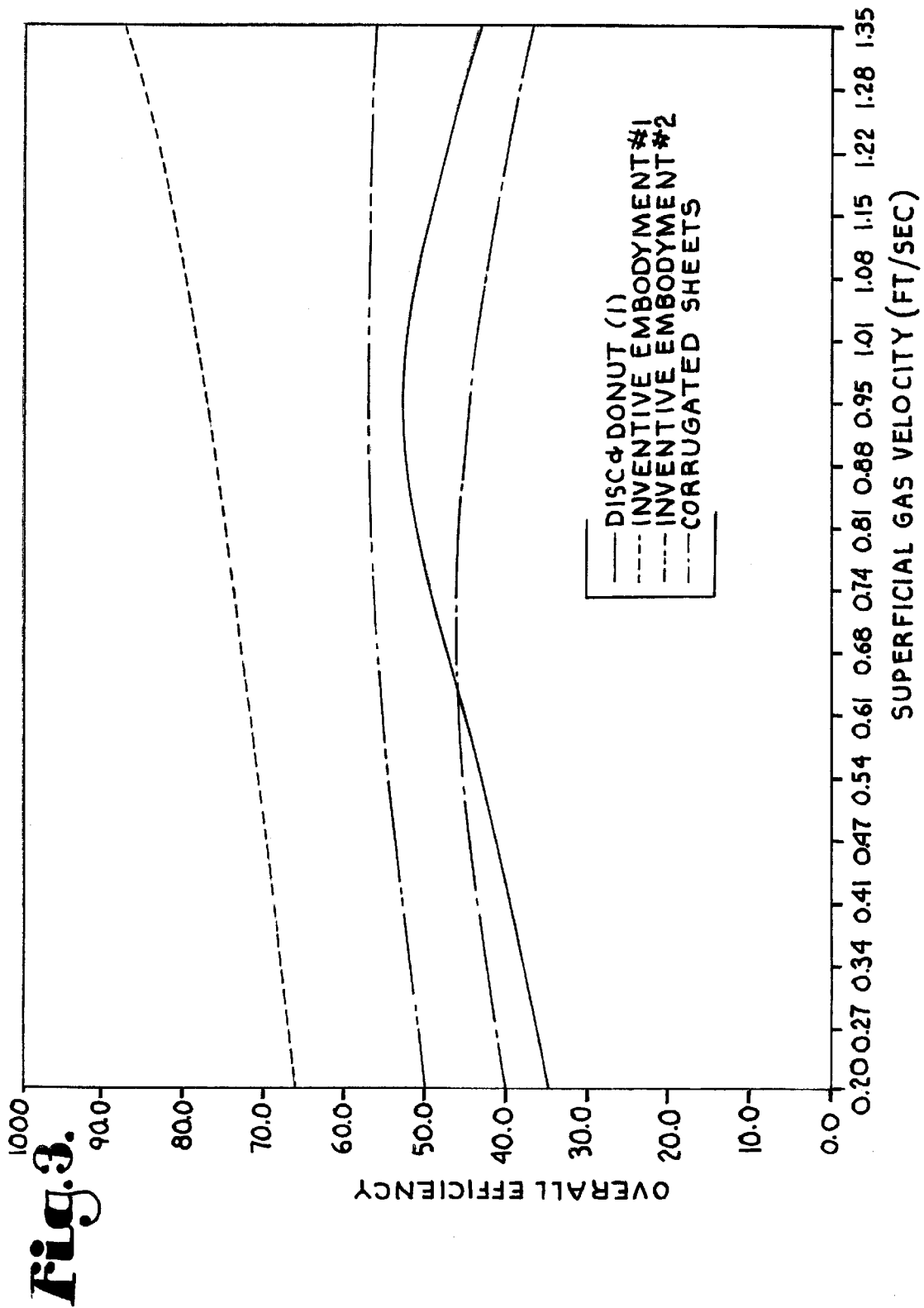
FIG. 3 is a graph comparing the overall stripping efficiencies of the contacting element of the present invention with other contacting element.

A series of different packing elements were tested to determine stripping efficiencies using air to strip helium from FCC equilibrium catalyst in a dynamic cold flow column. Two embodiments of the contacting elements of the present invention having deflecting portions 14 arranged at an angle of 60 degrees to the vertical axis of the column were tested. In the first embodiment, the diamond pattern formed by the intersecting deflecting portions 14 had dimensions of 7.5 inches in height and 4.33 inches in width. The corresponding dimensions of the second embodiment were 5.0 inches in height and 2.88 inches in width. The contacting elements were tested against corrugated sheets having a 2.5 inch crimp height with a 60 degree corrugation angle and conventional disc and donut type tray baffles. The test results were then analyzed using a stage-wise efficiency model in which one disk or donut tray was equal to one stage. The analyzed results are set forth in FIG. 3 and it can be seen that the contacting elements 10 performed significantly and even remarkably better than both the corrugated sheets and the disk and donut trays across the entire range of gas flow velocities. The contacting elements 10 also demonstrated an excellent turndown performance.

Having thus described the invention, what is claimed is:

1. A gas-solid fluidized bed comprising:
 a container having a shell and an open internal region within the shell;
 a contacting device positioned within said open internal region and comprising pairs of planar portions arranged in intersecting planes, each planar portion comprising one or more webs and one or more open slots adjacent each web, the webs and slots being arranged such that a web in one of the planar portions intersects a slot in the paired planar portion;
 solid particles within the contacting device; and
 at least one gas stream flowing in a first direction through the contacting device and causing fluidization of the solid particles within the contacting device to form said gas-solid fluidized bed.

2. The gas-solid fluidized bed of claim 1, including gas stream flow conduits in communication with the container for directing the gas stream into the open internal region for said flow through the contacting device and removing the gas stream from the container after said flow through the contacting device.

3. The gas-solid fluidized bed of claim 2, including solid particle flow conduits in communication with the container for directing the solid particles to the contacting device and removing the solid particles from the container after passing through the contacting device.

4. The gas-solid fluidized bed of claim 3, wherein said gas flow conduits and solid particle flow conduits are arranged to provide countercurrent flow of said solid particles and said gas stream.

5. The gas-solid fluidized bed of claim 3, wherein said solid particles comprise catalyst particles.

6. The gas-solid fluidized bed of claim 5, which is selected from the group consisting of an FCC catalyst stripper and an FCC catalyst regenerator.

7. A process for fluidizing solid particles within a container having a shell and a contacting device positioned within an open internal region within the shell, said contacting device comprising pairs of planar portions arranged in intersecting planes, each planar portion comprising one or more webs and one or more open slots adjacent each web, the webs and slots being arranged such that a web in one of the planar portions intersects a slot in the paired planar portion, said process comprising the steps of:
 providing a quantity of solid particles within the contacting device; and
 causing fluidization of the solid particles within the contacting device by flowing at least one gas stream through the contacting device.

8. The process of claim 7, including directing the solid particles through the contacting device in a direction countercurrent to a flow direction of the gas stream.

9. The process of claim 8, including providing additional quantities of solid particles within the contacting device while removing at least some of the fluidized solid particles from the contacting device while said gas stream is flowing through the contacting device.

10. The process of claim 7, including retaining the quantity of solid particles within the contacting device while the gas stream is flowing through the contacting device.

11. The process of claim 7, wherein said solid particles are catalyst particles associated with volatile hydrocarbons, and wherein during said step of flowing said gas stream through the contacting device at least some of the volatile hydrocarbons are stripped from the catalyst particles by the gas stream during said fluidization.

12. The process of claim 11, wherein said gas stream comprising water vapor.

13. The process of claim 7, wherein said solid particles are catalyst particles containing coke deposits, and including the step of burning the coke deposits to cause regeneration of the catalyst particles during said step of flowing said gas stream through the contacting device.

14. The process of claim 7, wherein during said fluidization of the solid particles within the contacting device the webs of the contacting device impede flow of the solid particles in a direction of flow of the gas stream.

15. The process of claim 7, processing selected from the group consisting of one or more of mass transfer, heat exchange and chemical reaction occurs during said fluidization of the solid particles.

* * * * *